(12) United States Patent
Taylor et al.

(10) Patent No.: US 7,606,873 B2
(45) Date of Patent: Oct. 20, 2009

(54) INITIATING DISTRIBUTION OF SERVER BASED CONTENT VIA WEB-ENABLED DEVICE

(75) Inventors: Brandon Vaughn Taylor, Seattle, WA (US); Malcolm Haar, San Francisco, CA (US); Tia Gao, Rockville, MD (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/692,435

(22) Filed: Oct. 23, 2003

(65) Prior Publication Data

US 2005/0108323 A1 May 19, 2005

(51) Int. Cl.
*G06F 15/16* (2006.01)
(52) U.S. Cl. ................. 709/217; 709/201; 709/202; 709/203; 709/237; 358/403
(58) Field of Classification Search ......... 709/201–203, 709/217, 237; 358/402
See application file for complete search history.

(56) References Cited

U.S. PATENT DOCUMENTS

| | | | |
|---|---|---|---|
| 6,442,598 B1 * | 8/2002 | Wright et al. ............... | 709/217 |
| 6,671,715 B1 * | 12/2003 | Langseth et al. ............ | 709/203 |
| 2002/0041399 A1 | 4/2002 | Ichikawa .................... | 358/402 |
| 2002/0049853 A1 | 4/2002 | Chu et al. ................... | 709/237 |
| 2002/0194307 A1 * | 12/2002 | Anderson et al. ........... | 709/219 |
| 2003/0005050 A1 | 1/2003 | Pineau et al. ............... | 709/203 |
| 2003/0126088 A1 * | 7/2003 | Mineyama ................... | 705/51 |
| 2004/0044731 A1 * | 3/2004 | Chen et al. .................. | 709/203 |

FOREIGN PATENT DOCUMENTS

| | | |
|---|---|---|
| EP | 1 274 017 A1 | 1/2003 |
| JP | 11-239238 | 8/1999 |
| JP | 2002-073462 | 3/2002 |
| JP | 2002-189943 | 7/2002 |

OTHER PUBLICATIONS

Roccetti et al. "The structuring of a wireless internet application for a music-on-demand service on UMST devices", Mar. 2002, ACM Press, pp. 1066-1073.*
Chen et al. "iMobile EE: an enterprise mobile service platform", Jul. 2003, Kluwer Academic Publishers, vol. 9, Issue 4, pp. 283-297.*
Schilit et al. "m-Links: An Infrastructure for Very Small Internet Devices", Jul. 2001, ACM Press, pp. 122-131.*
Bia, A., "A Versatile Facsimile and Transcription Service for Manuscripts and Rare Old Books at the Miguel de Cervantes Digital Library", *JCDL*, Jun. 24-28, 2001, p. 477.

(Continued)

*Primary Examiner*—Yves Dalencourt
*Assistant Examiner*—Michael C Lai
(74) *Attorney, Agent, or Firm*—Woodcock Washburn LLP (57) ABSTRACT

Content that is stored on a remote server is distributed via a communications network. The distribution of the content, such as a document or pictures, is initiated via a properly enabled device, such as a web-enabled phone, handheld computer, personal digital assistant (PDA), or personal computer. In this manner, a website can be used as a repository for documents, and the sender is not required to have physical possession of the document to be sent or have a locally stored electronic copy of the document to be sent.

19 Claims, 5 Drawing Sheets

OTHER PUBLICATIONS

Fullmer, C. et al., "A TCP/IP Network Facsimile System Built from Publicly Available Software", *ACM*, 1992, 525-532.

Postel, J.B. et al., "An Experimental Multimedia Mail System", *ACM Transactions on Office Information Systems*, 1988, 6(1), 63-81.

Walker, L. "The Fact Is, Free Fax Attracts", http://www.washingtonpost.com/wp-srv/business/longterm/tech/techthursday/dotcom, *The Washington Post Company*, 1999, 1-4.

www.xdrive.com- "Frequently Asked Questions", X Drive File Share Utility, Apr. 8, 2000, XP009054821, 4 pages.

* cited by examiner

INITIATING DISTRIBUTION OF SERVER BASED CONTENT VIA WEB-ENABLED DEVICE

FIELD OF THE INVENTION

This invention relates in general to the field of content distribution. More particularly, this invention relates to the initiation of the distribution of content, residing at a server, via a communications network.

BACKGROUND OF THE INVENTION

The electronic distribution of content over a communications network, such as the internet or a public switched telephone network (PSTN), is pervasive. A facsimile (fax) is one type of content that is electronically communicated over these types of networks. For example, a fax can be communicated from one device or system (i.e., the originator) to another device or system (i.e., the receiver). Exemplary devices or systems that can act as the originator or receiver include standalone fax machines and email accounts. Currently, there are various services that allow a user to send faxes from a computer over the internet. However, a drawback of the currently available services and systems for content distribution over a network is that the originating device or system must have a local copy of the content that is to be distributed.

A common experience when distributing content is via fax. One major problem with fax is that it requires the originator (sender) to have physical possession of the content that he wants to distribute. This is commonly achieved by printing out the content onto paper, providing the paper to a fax machine, and then the fax machine sends the content electronically through a phone line to the desired destination. This can also be achieved by sending the content from a computer over IP (Internet Protocol), such as fax over IP, as is well known in the art.

Figure 1:
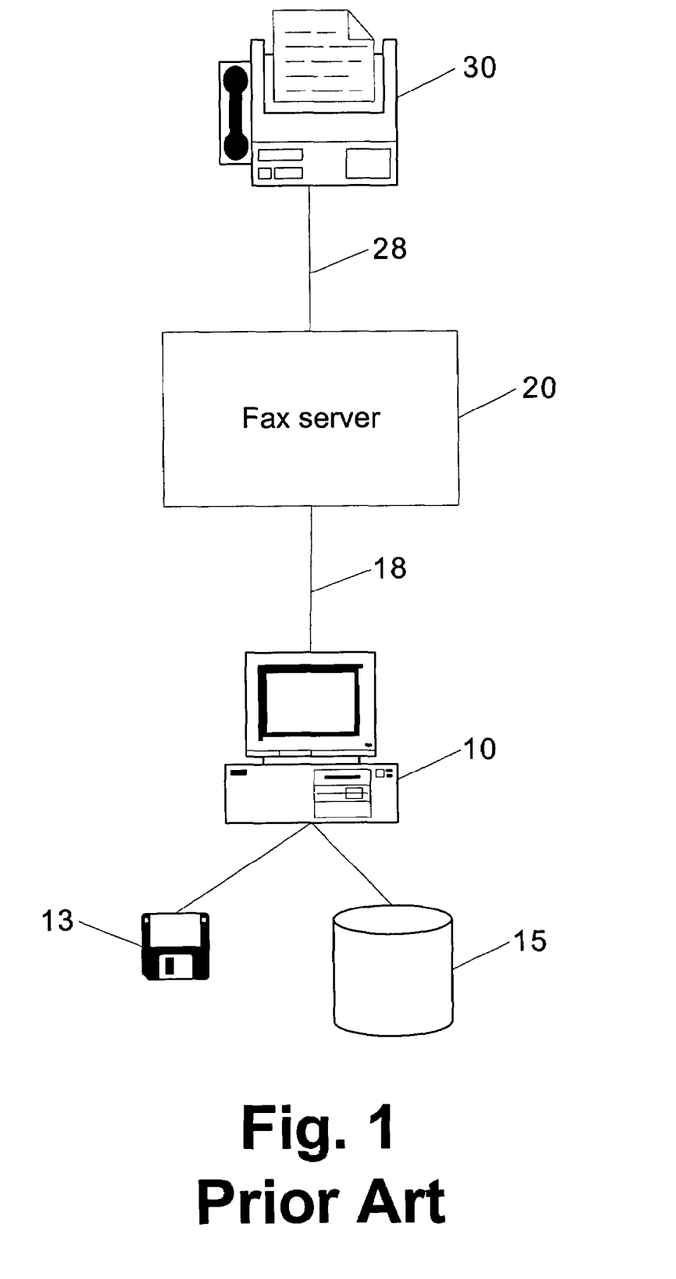
FIG. 1 is a block diagram of a prior art architecture for sending content over a network.
Figure 2:
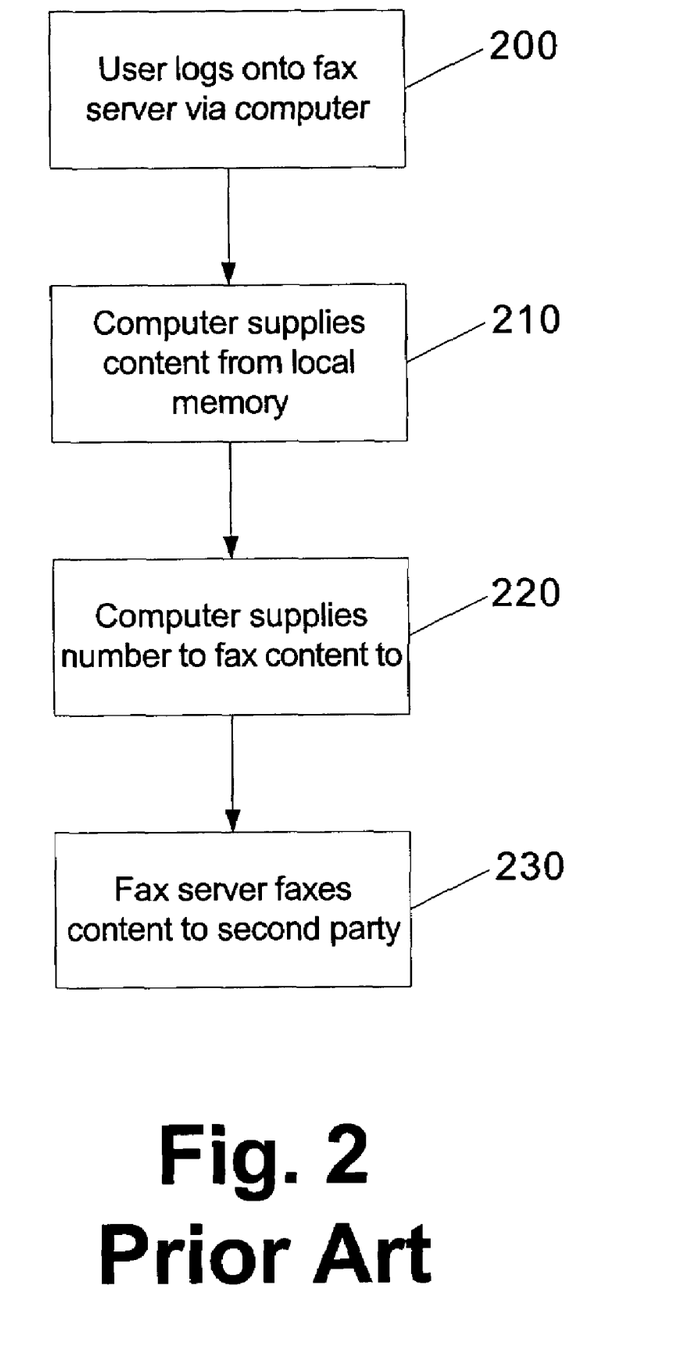
FIG. 2 is a flow diagram of a prior art content delivery process.

FIG. 1 is a block diagram of a prior art architecture for sending content over a network, and FIG. 2 is a flow diagram of a prior art content delivery process. A user seeking to distribute content accesses his computer 10 and retrieves a file from local storage, such as a disk 13 or other memory device 15, such as a hard disk drive associated with the computer 10. The computer 10 connects to a server, such as a fax server 20, over a network 18 (step 200) and provides the selected content to the fax server 20 (step 210), along with a selected distribution address or fax number (step 220). The fax server 20 then initiates a connection over a network 28 with the receiver's device, such as a fax machine 30 and provides the content over the network 28 to the fax machine 30 (step 230).

Thus, conventionally, the originator must have either a physical copy of the content desired to be transmitted or a local resident memory that stores the content desired to be distributed. This is disadvantageous because oftentimes a user will want to send content, such as a fax, over a network but neither have a physical copy of that content or have that content locally stored.

It is common for web faxing services to allow a user to upload a file to their server right before faxing, but there is no system or method that stores documents on a server and allows them to be manipulated remotely for distribution such as by faxing.

In view of the foregoing, there is a need for systems and methods that overcome the limitations and drawbacks of the prior art.

SUMMARY OF THE INVENTION

The present invention is directed to the distribution of content, such as a document or pictures, over a network. The content is stored on a remote server, and distribution is initiated via a properly enabled device, such as a web-enabled (or browser-enabled) phone, personal digital assistant (PDA), or other device, such as a laptop computer, a desktop computer, a kiosk, etc. In this manner, a website can be used as a repository for documents, and the sender is not required to have physical possession of the document to be sent or have a locally stored electronic copy of the document to be sent.

An exemplary system and method for distributing content over a communications network comprises generating a list of accessible content available at a server, the content having been provided by a first party, and providing the list to a device associated with the first party. A user selects items from the list, enters the selection into the device, which in turn provides the selection to the server. The server retrieves the selected content from its storage. This retrieved content is then sent to the designated destination device or devices.

Preferably, the user provides login information to the device, which is then authenticated, prior to the user being able to access the content on the server. The user may also provide a phone number(s) or address(es) for the designated device(s) so that the content can be properly distributed to the designated device. Distribution methods can include faxing, instant messaging, email, and fax over IP (Internet Protocol), for example.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Content such as a document or pictures is stored on a server and distributed. A user is able to remotely initiate transmission of data that is stored on the server from a website (e.g., via a computer located at a kiosk) or a web-enabled device such as a phone or handheld computer, to the desired destination without the need to print out the content beforehand, the need for local storage of the content, the need to find a connected working fax device, or the need to monitor the transaction until completion to ensure successful delivery of the content to the intended recipient.

A document is stored upon a server. A transport device (e.g., faxing) is initiated from server-connected interfaces while not requiring the originator to have actual possession of the content. The server allows the content to be accessed from any web device that can connect to the server via some type of network connection. The only requirements of the web server is that it be able to enumerate its files so that the web device (browser or phone) can accurately display what its contents are, so that the user can select which content to distribute. Upon selection of the item(s), preferably there is a word or icon, for example (e.g., "fax") which initiates the process via a defined protocol (e.g., XML over SOAP). The server then retrieves the content from its database and pushes it toward a network-based faxing service, for example. The faxing service can be implemented using fax over IP, which would then receive the request for a fax, the content of the fax, the destination of the fax, and deliver the content accordingly.

Figure 3:
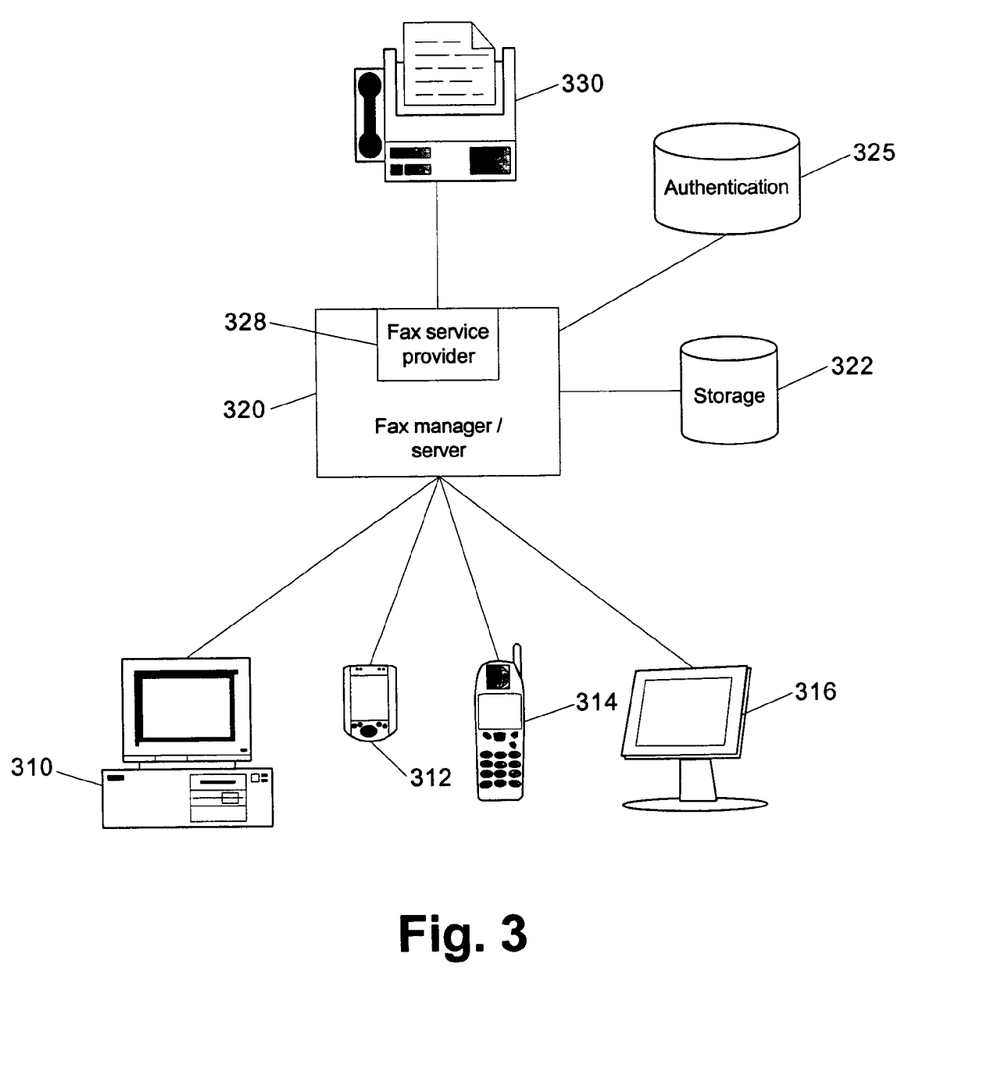
FIG. 3 is a block diagram of an exemplary content delivery system in accordance with the present invention.
Figure 4:
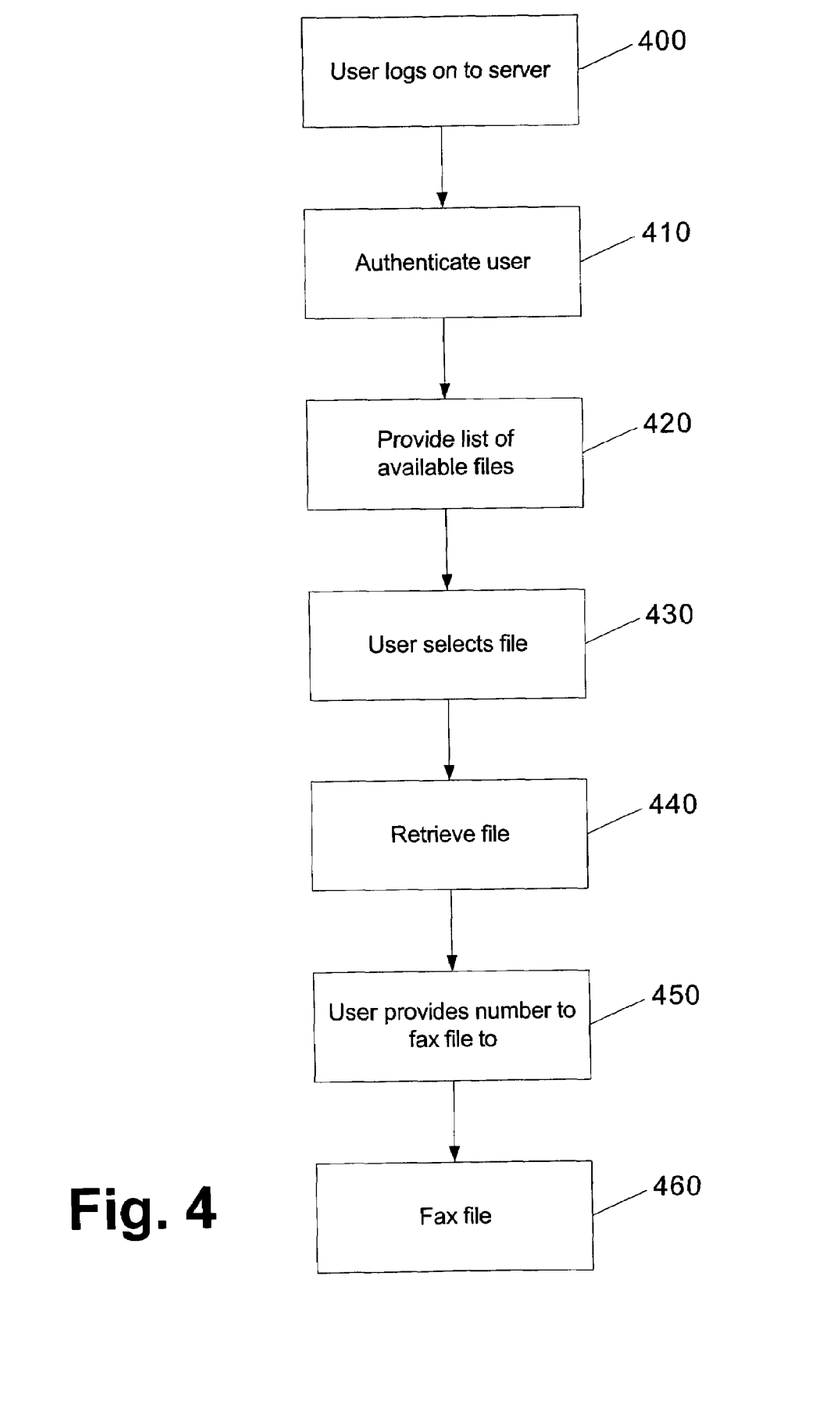
FIG. 4 is a flow diagram of an exemplary content delivery process in accordance with the present invention.

FIG. 3 is a block diagram of an exemplary content delivery system, and FIG. 4 is a flow diagram of an exemplary content delivery process, in accordance with the present invention. In the exemplary system, the content to be selected and distributed is not stored locally, but instead is stored in storage 322 associated with a fax manager or server 320. The content was desirably initially stored in storage 322 by the user or his associates.

A user logs onto the fax manager or server 320 using a web-enabled device, such as a personal computer 310, a personal digital assistant or handheld computer 312, a phone 314, or a workstation 316, for example (step 400). This login information may be subsequently authenticated. The web-enabled device may be privately owned by the user, or be publicly accessible, such as in a kiosk.

The user is desirably authenticated or validated to the fax server 320 (step 410) using any conventional authentication and/or validation technique(s). An authentication system, server, or database 325 is desirably provided to perform the authentication. Billing and currency information can also be provided/exchanged.

After the user has been authenticated to the fax server 320, the fax server 320 generates a list of available content and provides the list to the web-enabled device (step 420). The content may be any type of data or information such as pictures or documents. The content is stored in a storage device 322 that is associated with the fax server 320.

The user selects the desired content from the list provided to his device (step 430), and this selection is transmitted to the fax server 320. The fax server 320 retrieves the content from its storage device 322 (step 440) and prompts the user for the desired fax number or address, such as address to a fax server or email address, for example, that the content is to be delivered to. The user provides the desired fax number or address to the fax server 320 (step 450). It is contemplated that the user can provide the fax number or address to the fax server 320 prior to the server 320 retrieving the selected content, such as before, or concurrent with, the user's selection of the desired content. Multiple fax numbers or addresses may be provided if the content is desired to be delivered to multiple destinations.

After the fax server 320 has the desired content and the fax number or address, the fax server 320 provides this content and number/address to a fax service provider 328, which in turn, faxes the content to the number/address (step 460) using any of the conventional distribution techniques, for reception by the fax recipient device 330, such as a fax machine or personal computer. The fax service provider 328 can be associated with the fax server 320 (as shown) or can be an independent entity, either related or unrelated to the fax server 320.

Although the above exemplary embodiments have been described with respect to fax delivery, the invention is not limited to fax distribution. Any distribution method can be implemented, such as instant messaging, for example. In such a case, for example, a user would access the server, select the desired content stored in a storage device associated with the server, and then instant message the content to a second party.

The web-enabled devices 310, 312, 314, 316 and fax server or manager 320, along with the fax service provider 328 and fax recipient device 330, can be deployed as part of a computer network and/or communications network. The server or manager 320 is in communication with the devices 310, 312, 314, 316 and the service provider 328 and device 330 via a network, in which the present invention may be employed. The communications network may be a local area network (LAN), wide area network (WAN), intranet, the internet, or other computer network. In a network environment in which the communications network is the internet, for example, the server 320 can be a web server with which the devices communicate via any of a number of known protocols, such as, hypertext transfer protocol (HTTP) or wireless application protocol (WAP).

Each device 310, 312, 314, 316 can be equipped with a browser to gain access to the servers 320 and to display and receive various data and inputs. The content is desirably stored on server computers and communicated to the service provider 328 and ultimately the recipient device 330, over the communications network. An appropriate listing of the content stored on the server computers that is accessible to the authenticated user is provided to the devices 310, 312, 314, 316 over the communications network.

Thus, the present invention can be utilized in a computer network environment having client computing devices for accessing and interacting with the network and a server computer for interacting with client computers and the recipient device(s). However, the systems and methods described herein can be implemented with a variety of network-based architectures, and thus should not be limited to the example shown.

Exemplary Computing Environment

Figure 5:
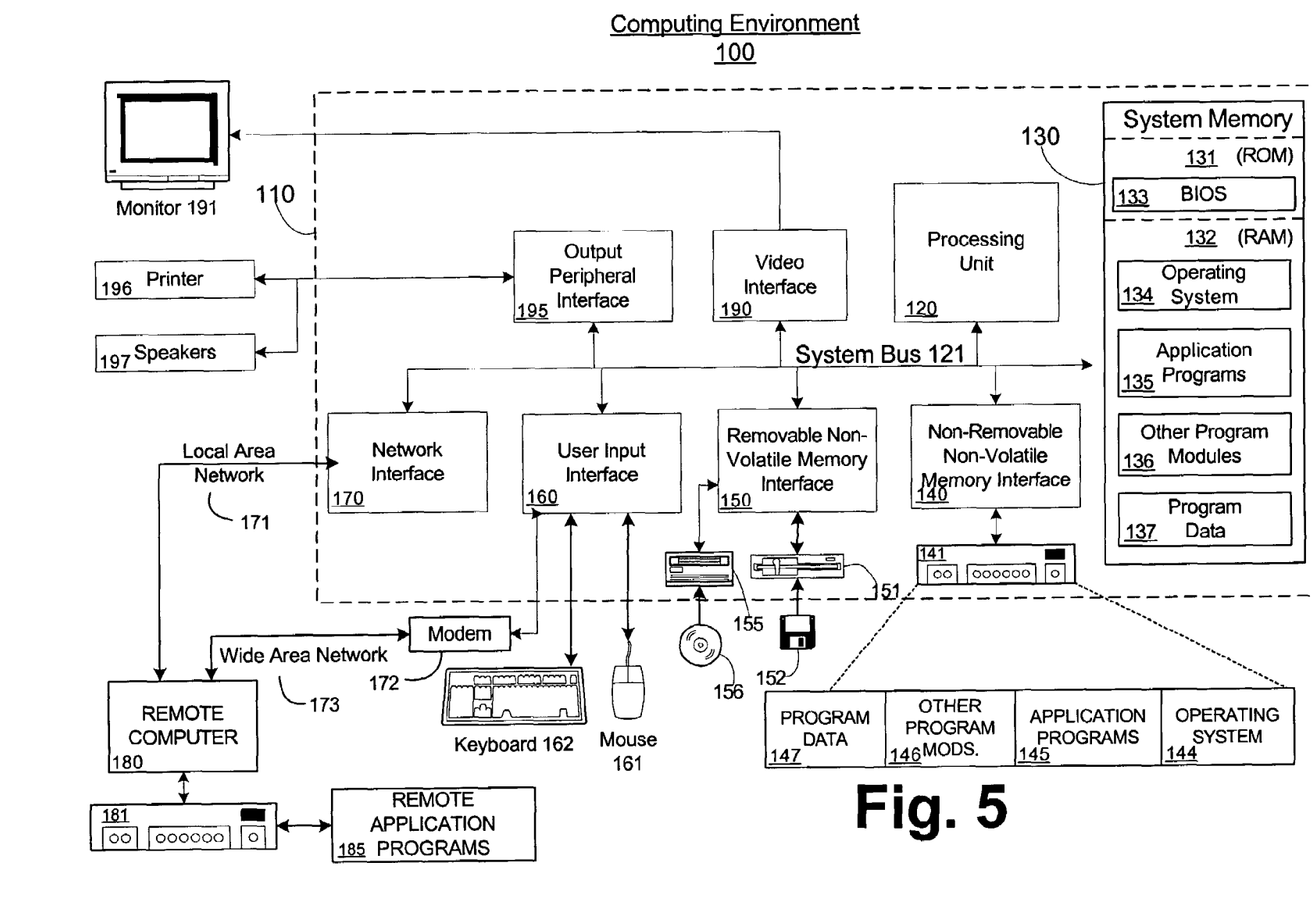
FIG. 5 is a block diagram showing an exemplary computing environment in which aspects of the invention may be implemented.

FIG. 5 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/non-volatile computer storage media. By way of example only, FIG. 5 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted include a LAN 171 and a WAN 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for websites, enabled by greater use of XML rather than HTML, (3) online services that feature customized access and delivery of products and services to the user from a central starting point for the management of various applications, such as e-mail, for example, or software, such as MICROSOFT®'s Office, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method for distributing content over a communications network, the method comprising:
storing content at a storage associated with a fax server;
logging on to the fax server by a web-enabled device operated by a user;
authenticating the web-enabled device;
generating a list of accessible content available at the fax server, the list including only content that is accessible to the web-enabled device and that was stored at the storage by the user or by an associate of the user from the content available at the fax server;
providing the list to the web-enabled device;
selecting a particular accessible content from the list;
transmitting the selection to the fax server;
retrieving the selected content from the storage associated with the fax server;
sending destination information to the fax server by the web-enabled device as to one or more designated devices, not including the web-enabled device, which are selected by the web-enabled device to receive the selected content;
forwarding the selected content and destination information to a fax service provider;
faxing from the fax service provider the selected accessible content to the one or more designated devices.

2. The method according to claim 1, further comprising receiving a request for content distribution from the web-enabled device, prior to generating the list.

3. The method according to claim 1, further comprising receiving login information at the web-enabled device, and transmitting the login information to the fax server, wherein authenticating the web-enabled device comprises authenticating the login information.

4. The method according to claim 1, further comprising receiving a fax number for the one or more designated devices at the fax sewer from the web-enabled device, prior to faxing the selected accessible content.

5. The method according to claim 1, wherein the web-enabled device comprises a browser, further comprising receiving and displaying the list on the browser of the web-enabled device.

6. The method according to claim 1, wherein faxing comprises fax over IP.

7. The method according to claim 1, further comprising providing the web-enabled device so that the web-enabled device is publicly accessible.

8. A method for initiating the electronic distribution of content over a communications network, the method comprising:
   transmitting login information to a fax server from a device;
   authenticating the login information at the fax sewer, thereby authenticating the device;
   generating a list of accessible content at the fax server associated with the authenticated device, the content having been provided by a party associated with the authenticated device and stored at a storage associated with the fax server by the party associated with the authenticated device or by an associate of the party associated with the authenticated device;
   providing the list to the authenticated device;
   receiving, at the authenticated device, a selection of accessible content from the list;
   transmitting the selection to the fax server;
   retrieving the selected accessible content from the storage associated with the fax server;
   sending address/location information associated with a designated device to the fax server from the authenticated device, the designated device being different from the authenticated device;
   forwarding the selected content and destination designated device address/location information to a fax service provider; and
   faxing the selected accessible content from the fax service provider to the designated device using the address/location information.

9. The method according to claim 8, further comprising receiving a request for content distribution from the authenticated device, prior to generating the list.

10. The method according to claim 8, wherein sending address/location information associated with a designated device comprises sending a fax number to the fax server.

11. The method according to claim 8, wherein the authenticated device comprises a browser, further comprising receiving and displaying the list on the browser of the authenticated device.

12. The method according to claim 8, further comprising providing the authenticated device so that the authenticated device is publicly accessible.

13. A system for faxing content to a designated device, the system comprising:
   a web-enabled device that is different from the designated device and that can receive and provide a listing of content;
   a fax server with an associated storage device, the associated storage device maintaining content that had been previously provided by a party associated with the web-enabled device to the associated storage device, the fax server generating the listing of content, the listing including only content that is accessible to the web-enabled device and that had been previously stored at the associated storage device by the party or by an associate of the party, providing the listing to the web-enabled device, receiving a selection of content from the web-enabled device, retrieving the selected content, and forwarding the selected content to a fax service provider for faxing the selected content to the designated device selected by the web-enabled device; and
   an authentication system for authenticating the web-enabled device;
   wherein the listing provided to the web-enabled device only includes content that is accessible to the web-enabled device based on its authentication.

14. The system according to claim 13, wherein the web-enabled device sends a request for content distribution to the fax server to activate the fax server generating the listing of content.

15. The system according to claim 13, wherein the web-enabled device is adapted to receive login information and provide the login information to the fax server for authentication.

16. The system according to claim 13, wherein the server transmits the content to a fax number associated with the designated device.

17. The system according to claim 13, wherein the web-enabled device includes a browser that displays the listing.

18. The system according to claim 13, wherein the web-enabled device is publicly accessible.

19. The system according to claim 13, wherein the content comprises at least one of documents, pictures, and data.

* * * * *

UNITED STATES PATENT AND TRADEMARK OFFICE
CERTIFICATE OF CORRECTION

| | | |
|---|---|---|
| PATENT NO. | : 7,606,873 B2 | Page 1 of 1 |
| APPLICATION NO. | : 10/692435 | |
| DATED | : October 20, 2009 | |
| INVENTOR(S) | : Brandon Vaughn Taylor et al. | |

It is certified that error appears in the above-identified patent and that said Letters Patent is hereby corrected as shown below:

In column 8, line 66, in Claim 4, delete "sewer" and insert -- server --, therefor.

In column 9, line 15, in Claim 8, delete "sewer" and insert -- server --, therefor.

Signed and Sealed this
Twenty-second Day of February, 2011

David J. Kappos
*Director of the United States Patent and Trademark Office*